(12) United States Patent
Huels et al.

(10) Patent No.: US 10,711,864 B2
(45) Date of Patent: Jul. 14, 2020

(54) BELT OR BELT SEGMENT

(71) Applicant: ContiTech Transportbandsysteme GmbH, Hannover (DE)

(72) Inventors: Achim Huels, Barsinghausen (DE); Michael Moeschen-Siekmann, Noerten-Hardenberg (DE); Stanislaus Riepl, Garbsen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 102 days.

(21) Appl. No.: 16/010,126

(22) Filed: Jun. 15, 2018

(65) Prior Publication Data
US 2018/0298985 A1 Oct. 18, 2018

Related U.S. Application Data

(63) Continuation of application No. PCT/EP2016/072091, filed on Sep. 19, 2016.

(30) Foreign Application Priority Data

Dec. 15, 2015 (DE) .................. 10 2015 225 256

(51) Int. Cl.
*F16G 11/09* (2006.01)
*B65G 15/36* (2006.01)
(Continued)

(52) U.S. Cl.
CPC .............. *F16G 11/09* (2013.01); *B65G 15/36* (2013.01); *F16G 1/12* (2013.01); *F16G 3/02* (2013.01);
(Continued)

(58) Field of Classification Search
CPC .......... F16G 11/09; F16G 11/02; F16G 11/04; F16G 5/10; F16G 3/02; F16G 11/10; F16G 1/12; B65G 15/36
See application file for complete search history.

(56) References Cited

U.S. PATENT DOCUMENTS 3,105,390 A 10/1963 Funke et al.
5,246,101 A 9/1993 Flebbe
9,506,526 B2 11/2016 Moeschen-Siekmann et al.

FOREIGN PATENT DOCUMENTS

DE 1079397 B 4/1960
DE 1101062 B 3/1961
(Continued)

OTHER PUBLICATIONS

International search report dated Jan. 13, 2017 of international patent application PCT/EP2016/072091 on which this application is based.

*Primary Examiner* — Robert Sandy
*Assistant Examiner* — Louis A Mercado
(74) *Attorney, Agent, or Firm* — Gregory Adams; David L. Cate

(57) ABSTRACT

A belt or a belt segment has a plurality of strength members that run in the longitudinal direction (X) and are disposed so as to be mutually parallel, and has a connection element forming one end of the belt, or of the belt segment and is configured to be connected to a further connection element at the other end of the belt, or to an end of a further belt segment, or is configured to connect two ends of the belt, or of the belt segment, wherein at least one end of a strength member is connected in a force-fitting manner to a clamping body, wherein the clamping body can be held in a form-fitting manner by the connection element at least in the longitudinal direction (X) through a strength member lead- (Continued)

through. A strength member leadthrough in the longitudinal direction (X) has a widening facing the clamping body.

11 Claims, 5 Drawing Sheets

(51) Int. Cl.
*F16G 11/02* (2006.01)
*F16G 11/04* (2006.01)
*F16G 5/10* (2006.01)
*F16G 1/12* (2006.01)
*F16G 11/10* (2006.01)
*F16G 3/02* (2006.01)

(52) U.S. Cl.
CPC ................ *F16G 5/10* (2013.01); *F16G 11/02* (2013.01); *F16G 11/04* (2013.01); *F16G 11/10* (2013.01)

(56) References Cited

FOREIGN PATENT DOCUMENTS

| | | |
|---|---|---|
| DE | 102014224526 A1 | 6/2016 |
| DE | 102015212750 A1 | 1/2017 |
| EP | 0483630 A2 | 5/1992 |

BELT OR BELT SEGMENT

CROSS REFERENCE TO RELATED APPLICATION

This application is a continuation application of international patent application PCT/EP2016/072091, filed Sep. 19, 2016, designating the United States and claiming priority from German application 10 2015 225 256.6, filed Dec. 15, 2015, and the entire content of both applications is incorporated herein by reference.

BACKGROUND OF THE INVENTION

Belts closed in an endless manner represent closed annular elements which can be used for example as drive belts such as, for example, V-belts for power transmission. However, they can also be used as conveyor belts in order to transport loose bulk materials, for example. They can also be used as caterpillar tracks in tracked vehicles for moving the vehicle.

Belts of this type generally run around a drive and further guide or support rollers, in order for the drive power to be transmitted to a take-off element (V-belt), in order for the drive power to be utilized for transporting material (conveyor belt) or for a vehicle to be moved around (caterpillar track). To this end, these belts have a predetermined elasticity, which can be achieved for example by the use of an elastomeric material, for example rubber, as the base material of the belt. Moreover, these belts usually have one or more strength members in the longitudinal direction for transmitting the tensile forces in the running direction of the belt. The strength members can be, for example, steel cables which permit a particularly high force to be transmitted. However, woven textile fabrics are also commonplace as strength members.

Belts of this type can be produced, for example as V-belts, to some extent in an already closed manner. In most cases, for example as conveyor belts or caterpillar tracks, the belts are produced in a usually open manner, that is, as an elongate body, on account of their length in the longitudinal direction, and are also transported to the site of application in this state. They are then closed in an endless manner there. Closing in an endless manner can take place, for example, by the two ends being joined together by vulcanization, but this precludes a non-destructive separation of the ends and thus opening of the belt again, for example in the case of wear or damage. Furthermore, this requires a great deal of effort at the application site.

Therefore, it is known for the ends of the strength members to be left free of elastomeric material, or to be exposed, at the two ends of the open belt, and for these ends to be connected mechanically. This can take place, for example, in that the respective ends are clamped in a respective common coupling element and the two coupling elements are connected together, for example in a hinge-like manner, via a coupling bar. On account of this mechanical clamping connection being divided between two coupling elements which are then rotatable with respect to one another as a joint, the flexibility of the belt as a whole is intended to be limited as little as possible. This may be required in particular in the case of tight deflection radii.

U.S. Pat. No. 9,506,526 B2 shows a corresponding belt made of an elastomeric material having a strength member ply made of steel cables that extend in the longitudinal direction of the belt and are arranged parallel to one another. The steel cable ends are in each case clamped in a belt end body. The two belt end bodies are intercoupled in the manner of a hinge.

A belt that is closable in an endless manner, having at least one strength member that runs in the longitudinal direction of the belt and a common connection element which can interconnect the two strength member ends is known from DE 10 2014 224 526.5 (unpublished). The two strength member ends have in each case at least one holding element that is fastened in a force-fitting manner, the holding elements in the longitudinal direction being able to be held in a form-fitting manner by the connection element. To this end, the strength member ends can be press-fitted in the respective holding element and then be placed into a common receptacle space of the connection element. In this way, the holding elements can be held in a force-fitting manner at the strength member ends, and can be held in a form-fitting manner in the longitudinal direction, for example via crenelated protrusions of the connection element.

DE 10 2015 212 750.8 (unpublished) discloses a comparable mounting of the strength member ends, wherein the strength member ends here are in each case received in a form-fitting manner in separate connection elements via holding elements that are press-fitted thereon in a force-fitting manner. The two connection elements can interact in the manner of a hinge in order to establish the endless closure of the belt, as is the case in U.S. Pat. No. 9,506,526 B2.

It is disadvantageous herein that the strength member ends, on account of the latter being press-fitted, are usually deformed in the holding elements. This is caused by pressing forces which in the press-fitting of the holding elements act perpendicularly to the cross section of the strength members. The original circular cross section of the strength members within the holding element herein is usually deformed to an oval cross section. This oval cross section can continue outside the holding element. The oval deformation herein can decrease as the distance from the holding element in the longitudinal direction increases.

If the oval deformed region of the strength member which is outside the holding element is guided into a cylindrical opening such as, for example, a bore of the connection element which per se corresponds to the cylindrical cross section of the strength member, this can lead to a deflection of individual external strands of the strength member on the edges of the cylindrical openings. On account of this deflection, or of any buckling, respectively, of the oval strength member on the edges of the cylindrical opening, damage to or severing of the strands, respectively, can occur, on account of which the transmissible tensile force of the strength member can be reduced, the latter rupturing in the case of excessive tensile stresses.

SUMMARY OF THE INVENTION

It is an object of the invention to provide a belt that is closable in an endless manner, or a belt that is closed in an endless manner, the belt being of the type mentioned at the outset which avoids the disadvantages described above. The service life of a belt of this type is to be increased in particular. In particular, a belt of this type in which a deflection of a strength member, or of individual strands of a strength member, respectively, on the edges of the opening of the connection element can be avoided is to be provided. The intention is to at least provide an alternative to the known mechanical connections of belts of this type.

The object can, for example, be achieved via a belt or belt segment defining a longitudinal direction (X). The belt or belt segment includes: a plurality of strength members which run in the longitudinal direction (X) and are disposed so as to be mutually parallel; a connection element forming a first belt end of the belt or the belt segment and configured to be connected to a further connection element at a second belt end of the belt or to an end of a further belt segment or the connection element being configured to interconnect the first belt end and the belt second end of the belt or the belt segment; at least one clamping body; the plurality of strength members including at least one strength member end connected to the at least one clamping body in a force-fitting manner; the at least one clamping body being configured to be held in a form-fitting manner by the connection element at least in the longitudinal direction (X) through a strength member leadthrough; and, the strength member leadthrough, in the longitudinal direction (X), has a widening facing the at least one clamping body.

The object can, for example, further be achieved via a connection element for a belt or belt segment, the belt or belt segment defining a longitudinal direction (X) and having a plurality of strength members which run in the longitudinal direction (X) and are disposed so as to be mutually parallel, the belt or belt section further having at least one clamping body, the connection element forming a first belt end of the belt or the belt segment and configured to be connected to a further connection element at a second belt end of the belt or to an end of a further belt segment or the connection element being configured to interconnect the first belt end and the belt second end of the belt or the belt segment, the plurality of strength members including at least one strength member end connected to the at least one clamping body in a force-fitting manner. The connection element includes: a connection element body defining the strength member leadthrough through which the at least one clamping body of the strength member end can be held in a form-fitting manner at least in the longitudinal direction (X); and, wherein the strength member leadthrough, in the longitudinal direction (X), has a widening facing the clamping body.

The present disclosure relates to a belt or a belt segment having a plurality of strength members that run in the longitudinal direction and are disposed so as to be mutually parallel, the strength members preferably being steel cables which are able to transmit high tensile forces. The longitudinal direction should be understood to be the direction in which the belt or belt segment is or can be closed in an endless manner. The transverse direction, which can also be referred to as the width, and the height or thickness of the belt or belt segment extends perpendicularly thereto.

The belt or the belt segment furthermore has a connection element which forms one end of the belt, or of the belt segment, respectively, and is configured to be connected to a further connection element at the other end of the belt or to an end of a further belt segment, respectively, or is configured to connect two ends of the belt, or of the belt segment, respectively. In other words, a coupling of the two connection elements, for example in the manner of a hinge, can be established by way of two connection elements of this type which in each case receive one end of the belt, or of a belt segment, respectively. This may allow this coupling region to adapt better to a deflection of the closed belt about a drum, for example. Furthermore, a single connection element can receive both ends of the belt, or of two belt segments, respectively, and on account thereof can establish a direct and rigid connection between the two ends. A connection of this type in mechanical terms can be simpler and more robust, and have a shorter length in the longitudinal direction. A belt can be closed in an endless manner by the connection of its two ends, or a plurality of belt segments can be closed in an endless manner to form one belt via the connection of their ends.

To this end, in both cases at least one end of a strength member is connected in a force-fitting manner to at least one clamping body. This can take place preferably by press-fitting the clamping body on the end of the strength member. The clamping body can be held in a form-fitting manner by the connection element at least in the longitudinal direction through a strength member leadthrough.

The belt or the belt segment is characterized in that the strength member leadthrough in the longitudinal direction has a widening facing the clamping body. A widening is to be understood as a cross-sectional enlargement of the strength member leadthrough at the end thereof that faces the clamping body. On account thereof, a deflection of a strength member, or of individual strands of a strength member, respectively, on the edges of the strength member leadthrough can be avoided according to the invention, the deflection otherwise potentially leading to buckling and thus to damage to the strands, or the strength member, respectively. This can increase the permissible tensile force of the strength member as well as the service life of the latter.

The connection element is preferably configured in such a manner that the connection element can be fully integrated into the cross section of the belt or of the belt segment, respectively. This is to be understood to mean that the connection element, neither in terms of height or in terms of width, protrudes beyond the contour of the belt or of the belt segment, respectively. In this way, any influence on the running behavior of the endless closed belt can be avoided.

According to a further aspect of the present invention, the widening facing the clamping body may have a hyperbolic shape.

In the case of a hyperbolic or else conical widening it is advantageous for the latter to have a uniform profile which increases radially toward the outside. On account thereof, edges or the like in the region of the opening of the strength member leadthrough, which could lead to stress and thus to damage to the strength member, are avoided.

According to a further aspect of the present invention, the strength member leadthrough may be configured as a bore through the connection element.

In this way, the strength support leadthrough can be surrounded all around by the material of the connection element such that the forces of the form-fit can be transmitted in a uniform manner. Greater stability can be created on account thereof. In this case, it is necessary for the ends of the strength members to be plugged through the bores into the clamping body receptacle, where they are introduced into corresponding receptacles of the clamping body and can then be press-fitted therein.

According to a further aspect of the present invention, the strength member leadthrough may be configured as a groove through the connection element.

In other words, the material of the connection element is interrupted in its height, such that those ends of the strength members that are provided with the clamping body can be placed into the grooves from one side. In the process, the clamping body is placed into the clamping body receptacle at the same time. In this way, press-fitting can be performed independently of the connection element prior to this step.

According to a further aspect of the present invention, the strength member leadthrough in the longitudinal direction may have a widening facing away from the clamping body.

In this way, buckling of the strength members can be avoided in particular in the event of the belt being bent, for example on a drum. In other words, it may be possible for the strength members to always extend in the neutral axis. This avoids damage to the strength members and increases the service life thereof, and thus the service life of the belt.

Preferably, this widening of the strength member leadthrough is also configured in a conical manner. On account thereof, the above-described advantages can be implemented in a simple manner. This is likewise the case for a hyperbolic shape of the widening.

According to a further aspect of the present invention, the belt or the belt segment, respectively, may have an elastomeric main body in which the strength members are embedded, wherein the ends of the strength members are exposed by the material of the elastomeric main body.

The material of the elastomeric main body is preferably a vulcanized rubber. In this way, an elastic belt or an elastic belt segment can be created. The lack of covering of the ends of the strength members should be understood here as an external lack of covering by the elastomeric material of the main body, such that the ends of the strength members such as steel cables, for example, appear to be bare toward the outside and, on account of their small cross section, can be introduced into the clamping body receptacles of the clamping body and be press-fitted therein.

The present invention also relates to a connection element for use in the case of a belt or a belt segment as has been described above, wherein the connection element has at least one strength member leadthrough through which a clamping body of an end of a strength member can be held in a form-fitting manner at least in the longitudinal direction, wherein the strength member leadthrough in the longitudinal direction has a widening facing the clamping body. An implementation of the type of connection of two belt ends or belt segment ends, respectively, described above can take place via connection element of this type.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
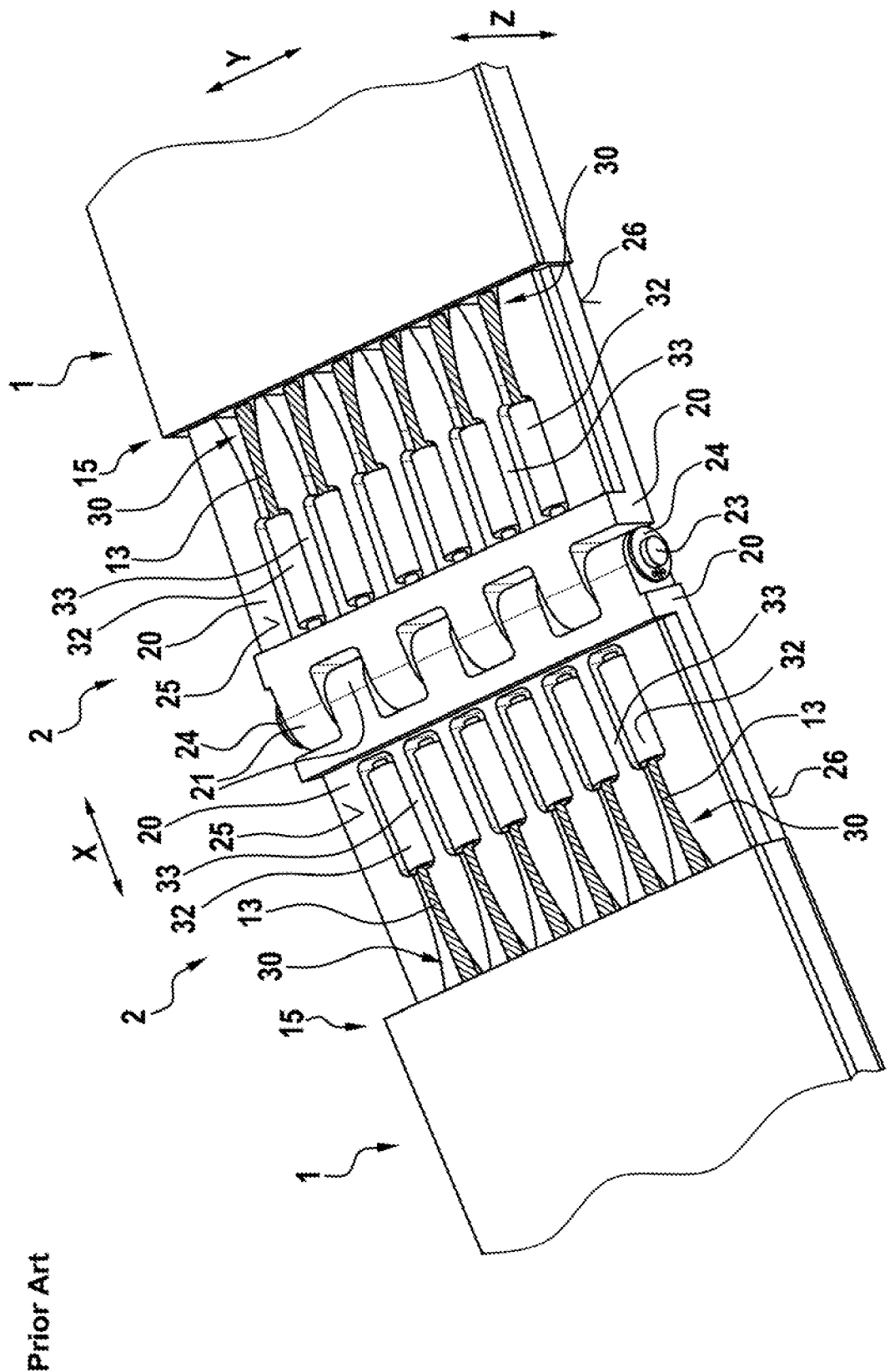
FIG. 1 shows a perspective schematic illustration of a belt that is closed in an endless manner, having connection elements according to the prior art, from obliquely above.
Figure 2:
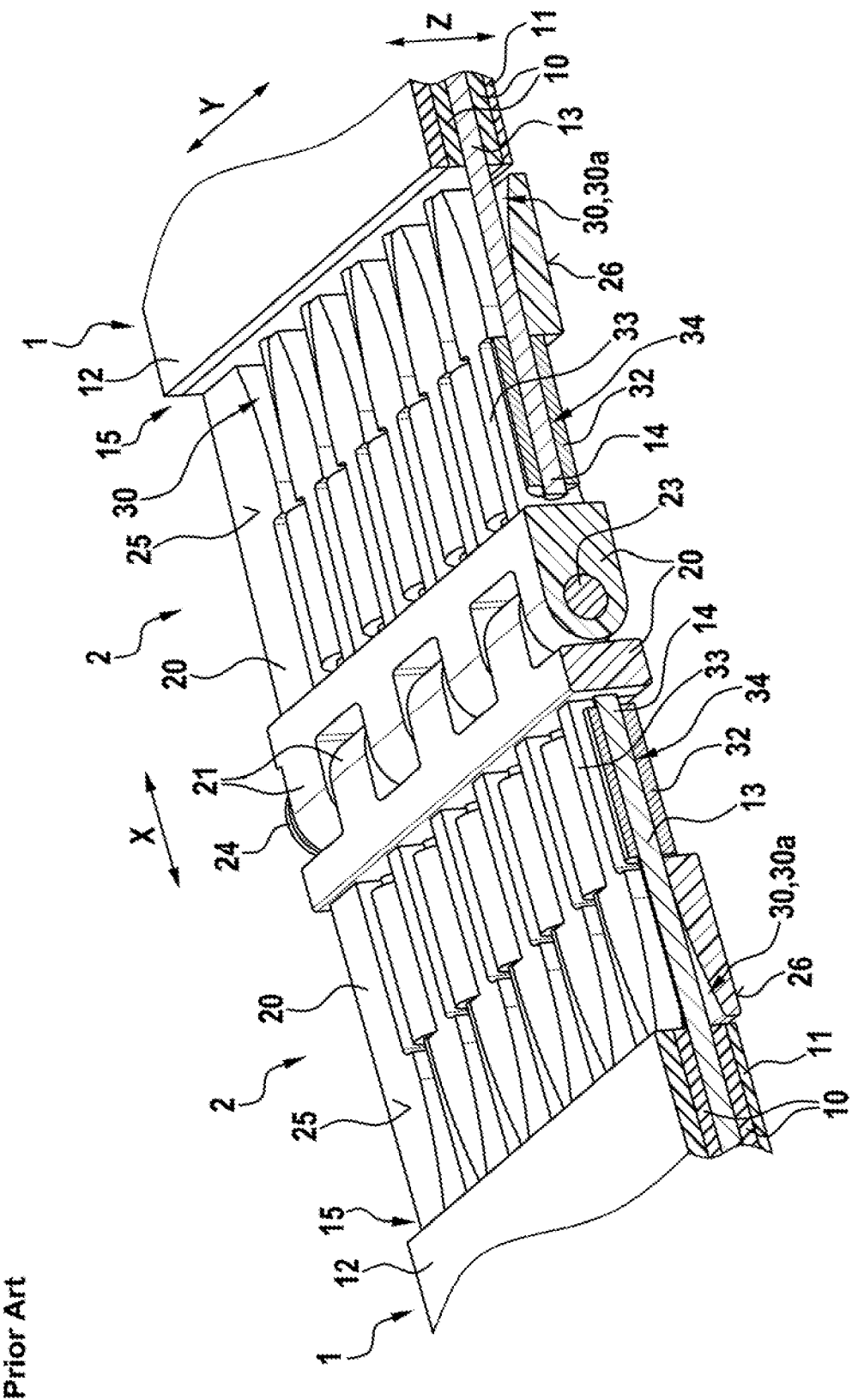
FIG. 2 shows a section in the longitudinal direction through the illustration of FIG. 1.

FIG. 1 shows a perspective schematic illustration of a belt 1 that is closed in an endless manner, having connection elements 2 according to the prior art, from obliquely above; FIG. 2 shows a section in the longitudinal direction X through the illustration of FIG. 1.

The belt 1 is closed in an endless manner in a longitudinal direction X. A transverse direction Y, which can also be referred to as the width Y, extends perpendicularly thereto. The height Z, which can also be referred to as the thickness Z, extends in each case perpendicularly thereto. These directional indications in Cartesian coordinates apply in an analogous manner to a connection element 2 which is illustrated on its own in FIGS. 3 to 5.

The connection element 2 has a main body 20 which composed of a hard or hardenable steel. On its one edge in the longitudinal direction X, the main body 20 has a plurality of crenelated protrusions 21 which each have transverse bores 22 extending in the transverse direction Y. The main body 20 has an external belt side 25 which forms the top side 25 of the main body 20. The main body 20 also has an internal belt side 26 which forms the underside 26 of the main body 20.

Figure 3:
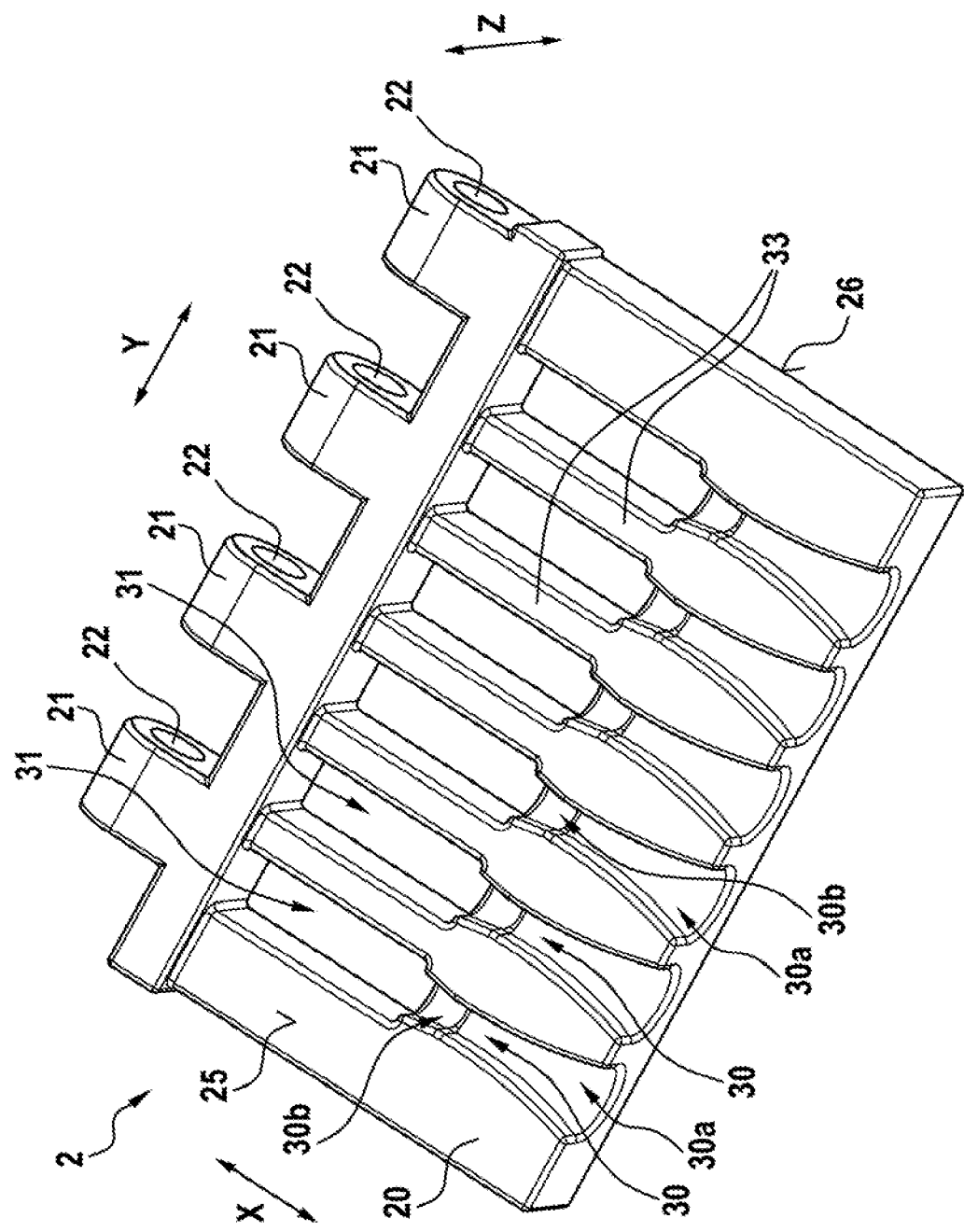
FIG. 3 shows a perspective schematic illustration of a connection element from obliquely above.

The connection element 2 also has a plurality of clamping body receptacles 31 which are in each case configured as a rectangular clearance within the main body 20 (cf. also FIG. 3). The clamping body receptacles 31 are configured so as to be open toward the upper side 25 and the lower side 26, and in the transverse direction Y are mutually separated by webs 33 that run in the longitudinal direction X. The webs 33 are a component part of the main body 20 and can transmit forces in the longitudinal direction X and, on account thereof, can counteract any warping of the connecting element 2 on account of stresses in the longitudinal direction X.

In each case one strength member leadthrough 30 extends from the clamping body receptacles 31 in the longitudinal direction X, counter to the direction of the crenelated protrusions 21, through the main body 20. The strength member leadthroughs 30, toward the belt 1, have in each case a widening 30a facing away from the clamping body receptacle 31. The strength member leadthroughs 30 are embodied in the form of grooves.

In each case one clamping body 32 that is shaped in a corresponding manner is disposed in the clamping body receptacles 31. The clamping bodies 32 are in each case configured so as to be cylindrical and have a cylindrical strength member receptacle 34 which runs in the longitudinal direction X and in which the ends 14 of strength members 13 in the form of steel cables 13 are clamped by press-fitting (cf. FIG. 2, for example). To this end, the steel cables 13 are not covered, at their ends 14, by the material of an elastomeric main body 10 of the belt 1.

In its height Z, the elastomeric main body 10 has a lower elastomeric cover layer 11 and an upper elastomeric cover layer 12. The exposed ends 14 of the steel cables 13, conjointly with the clamping body 32 and the connection element 2, form the belt end 15. The two connection elements 2 of two belt ends 15 of the same belt 1 or of two belt segments 1 are interconnected in an articulated manner via a coupling bar 23 through the transverse bores 22 of the connection elements 2. The coupling bar 23 is secured in this position by coupling bar securing means 24 on both sides in the transverse direction Y.

Figure 4:
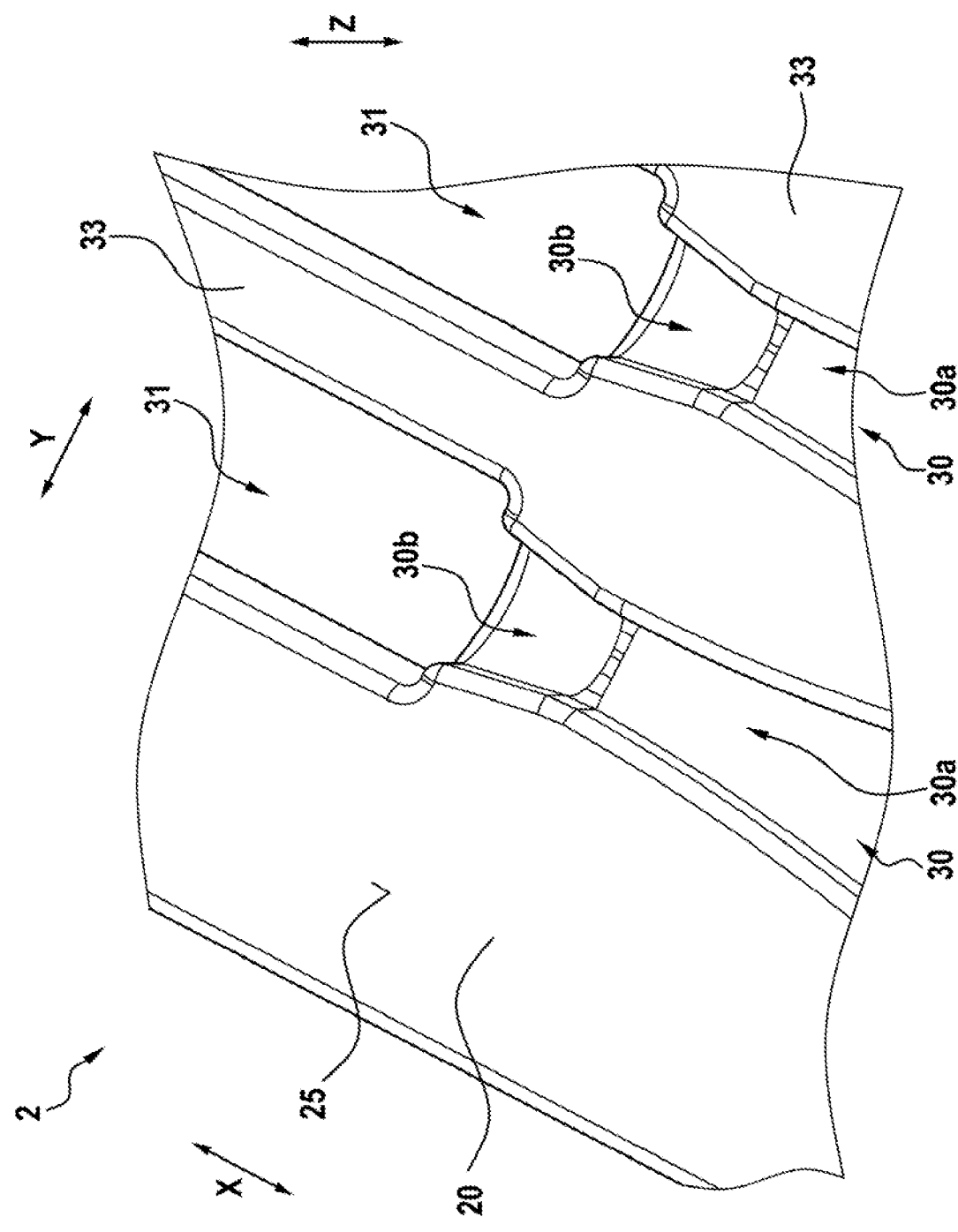
FIG. 4 shows a detailed view of the illustration of FIG. 3.
Figure 5:
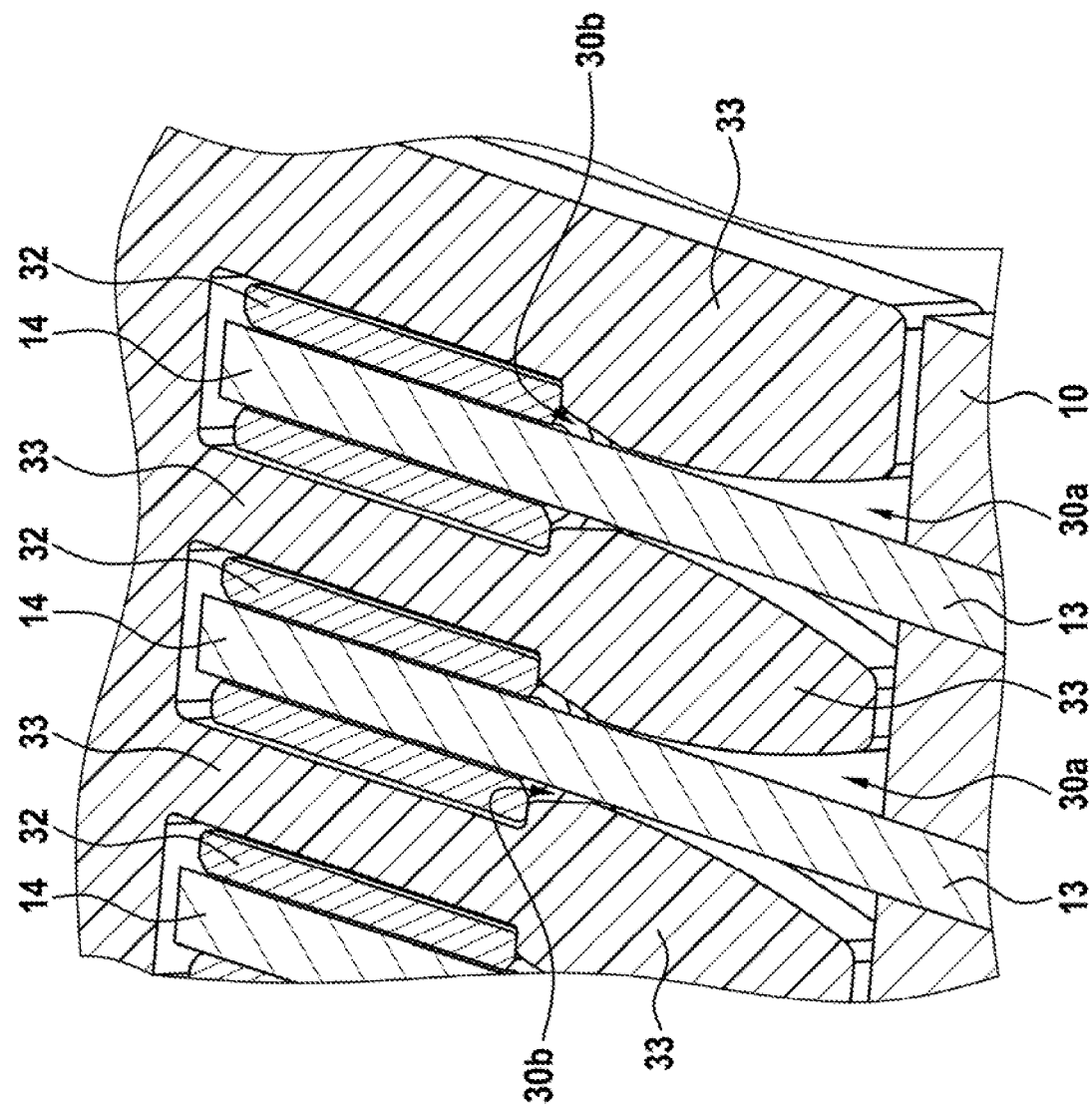
FIG. 5 shows a detailed view of the illustration of FIG. 3, having strength member ends and clamping bodies.

FIG. 3 shows a perspective schematic illustration of a connection element 2 per se according to the invention from obliquely above. FIG. 4 shows a detailed view of the illustration of FIG. 3. FIG. 5 shows a detailed view of the illustration of FIG. 3, having strength member ends 14 and clamping bodies 32.

According to the invention, the opening of each strength member leadthrough 30 that faces the clamping body receptacle 31 or the clamping body 32, respectively, also has a widening 30b which in terms of the configuration of the latter corresponds to the widening 30a that in the longitudinal direction X is opposite the widening 30b. In this way, any buckling of the strength members 13 at the transitions from the strength member leadthrough 30 toward the clamping body receptacles 31, or toward the clamping bodies 32, respectively, can be avoided.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Specification)
X Longitudinal direction of the belt 1 or belt segment 1, respectively
Y Transverse direction or width of the belt 1 or belt segment 1, respectively
Z Height or thickness, respectively, of the belt 1 or belt segment 1, respectively
1 Belt or belt segment, respectively
10 Elastomeric main body
11 Lower elastomeric cover layer
12 Upper elastomeric cover layer
13 Strength members, or steel cables, respectively
14 End of the strength members 13
15 Belt end or belt segment end, respectively
2 Connection elements
20 Main body
21 Crenelated protrusions
22 Transverse bores of the crenelated protrusions
23 Coupling bar
24 Coupling bar securing means
25 External belt side or upper side, respectively, of the main body 20
26 Internal belt side or lower side, respectively, of the main body 20
30 Strength member leadthrough of the main body 20, bore or groove, respectively
30a Widening of the strength member leadthrough 30, facing away from the clamping body, or on the external side, respectively
30b Widening of the strength member leadthrough 30, facing the clamping body, or on the internal side, respectively
31 Clamping body receptacle
32 Clamping body
33 Webs of the main body 20 in the longitudinal direction X
34 Strength member receptacle of the clamping body 32 or clamping bodies 32, respectively

What is claimed is:

1. A belt or belt segment defining a longitudinal direction (X), the belt or the belt segment comprising:
a plurality of strength members which run in the longitudinal direction (X) and are disposed so as to be mutually parallel;
a connection element forming a first belt end of the belt or the belt segment and configured to be connected to a further connection element at a second belt end of the belt or to an end of a further belt segment or the connection element being configured to interconnect said first belt end and said second belt end of the belt or the belt segment;
a clamping body;
said plurality of strength members including at least one strength member end connected to said clamping body in a force-fitting manner;
a body receptacle having a rectangular clearance formed within the connection element and configured to receive the clamping body;
a leadthrough in the longitudinal direction formed within the connection element and adjacent the body receptacle, the leadthrough having a first widening facing away from crenelated protrusions of the connection element and a second widening facing toward the crenelated protrusions of the connection element, wherein the crenelated protrusions at the first belt end.

2. The belt or the belt segment of claim 1, wherein said second widening facing has a hyperbolic shape.

3. The belt or the belt segment of claim 1, wherein said leadthrough is configured in said connection element.

4. The belt or the belt segment of claim 1, wherein said leadthrough is configured as a groove through the connection element.

5. The belt or the belt segment of claim 1, wherein said leadthrough in the longitudinal direction (X) has a further widening facing away from said at least one clamping body.

6. The belt or the belt segment of claim 1 further comprising:
an elastomeric main body including a material;
said plurality of strength members being embedded in said elastomeric main body;
each of said plurality of strength members having respective ends; and,
said ends of said plurality of strength members being exposed by said material of said elastomeric main body.

7. The belt or the belt segment of claim 1, wherein the first widening facing is larger than the second widening facing.

8. The belt or the belt segment of claim 1, further comprising a plurality of additional body receptacles positioned transverse of the body receptable and a plurality of additional leadthroughs positioned transverse of the leadthrough.

9. The belt or the belt segment of claim 1, wherein the connection element has an external side and an internal side and wherein the body receptacle and the leadthrough are formed on the external side.

10. The belt or the belt segment of claim 1, further comprising webs that separate the body receptacle in a transverse direction and are configured to counteract warping based on stresses in the longitudinal direction.

11. A connection element for a belt or belt segment, the belt or the belt segment defining a longitudinal direction (X) and having a plurality of strength members which run in the longitudinal direction (X) and are disposed so as to be mutually parallel, the belt or the belt segment further having at least one clamping body, the connection element forming a first belt end of the belt or the belt segment and configured to be connected to a further connection element at a second belt end of the belt or to an end of a further belt segment or the connection element being
configured to interconnect the first belt end and the belt second end of the belt or the belt segment, the plurality of strength members including at least one strength member end connected to said at least one clamping body in a force-fitting manner, the connection element comprising:
a connection element body defining a strength member leadthrough through which the at least one clamping body of the strength member end can be held in a form-fitting manner at least in the longitudinal direction (X); and, wherein the strength member leadthrough, in the longitudinal direction (X), has a widening facing the clamping body and a second widening facing away from the clamping body.

\* \* \* \* \*